United States Patent Office

2,716,667
CHLORINE SUBSTITUTED (1-ARYL-2-NITROALKYL) PHENOLS AND METHOD OF PRODUCING SAME

Edward B. Hodge, Terre Haute, Ind., assignor to Commercial Solvents Corporation, Terre Haute, Ind., a corporation of Maryland No Drawing. Application September 25, 1952,
Serial No. 311,538

10 Claims. (Cl. 260—619)

My invention relates to new chlorine substituted (1-aryl-2-nitroalkyl)phenols having the formula

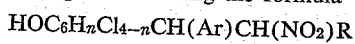

$$HOC_6H_nCl_{4-n}CH(Ar)CH(NO_2)R$$

wherein R is methyl or ethyl, Ar is phenyl, p-tolyl, 4-chlorophenyl, or 2,4-dichlorophenyl and $n$ is an integer from 1 to 3, the alkali metal salts of such compounds, and to methods of producing same.

My new compounds are produced by reacting a chlorophenol with a substituted or unsubstituted 1-phenyl-2-nitro-1-alkanol. The reaction requires a catalyst to cause it to proceed. I have found that this reaction proceeds smoothly and rapidly at easily controlled temperatures when catalyzed by concentrated sulfuric acid of a concentration of greater than about 70%.

This reaction may be conducted at temperatures ranging from about 0° to 40° C., but in the upper part of this range the reaction may become violent. To minimize this effect I prefer to conduct the reaction at from about 10° to about 30° C.

The incorporation in the reaction mixture of an organic solvent, which is inert under the conditions of the reaction, such as cyclohexane, serves to prevent the formation of gummy masses which otherwise hinder the completion of the reaction and complicate the recovery procedure. Therefore, although the reaction will proceed in its absence, I prefer to incorporate a relatively small amount of an inert organic solvent with my reactants.

Chlorophenols which can be reacted in my process include 2-chlorophenol, 3-chlorophenol, 4-chlorophenol, 2,5-dichlorophenol, 2,4-dichlorophenol, 2,3,6-trichlorophenol, 2,3,5-trichlorophenol, etc. Suitable 1-phenyl-2-nitro-1-alkanols include 1-phenyl-2-nitro-1-propanol, 1-phenyl-2-nitro-1-butanol, 1-p-chlorophenyl-2-nitro-1-propanol, 1-p-chlorophenyl-2-nitro-1-butanol, 1-p-tolyl-2-nitro-1-propanol, 1-p-tolyl-2-nitro-1-butanol, 1-(2,4-dichlorophenyl)-2-nitro-1-propanol, 1-(2,4-dichlorophenyl)-2-nitro-1-butanol, etc.

Examples of my new compounds which are formed by this reaction include 4-(1-p-chlorophenyl-2-nitropropyl)-2,5-dichlorophenol, 4-(1-p-chlorophenyl-2-nitrobutyl)-2,5-dichlorophenol, 4-(1-p-tolyl-2-nitrobutyl)-2,5-dichlorophenol, 2-(1-p-chlorophenyl-2-nitrobutyl)-3,4,6-trichlorophenol, 2-(1-p-chlorophenyl-2-nitrobutyl)-4,6-dichlorophenol, 4-(1-p-chlorophenyl-2-nitrobutyl)-2-chlorophenol, 2-(1-o,p-dichlorophenyl-2-nitrobutyl)-3,4,6-trichlorophenol, 4-(1-o,p-dichlorophenyl-2-nitrobutyl)-2,5-dichlorophenol, 2-(1-p-chlorophenyl-2-nitrobutyl)-4-chlorophenol, 4-(1-phenyl-2-nitrobutyl)-2-chlorophenol, and so forth.

The class of chlorine substituted (1-aryl-2-nitroalkyl)-phenols herein set forth and their alkali metal salts possess properties that make them very useful in a great variety of ways as antiseptics, bactericides, and preserving agents. Dilute solutions of these compounds exhibit strong antiseptic action against many species of bacteria, notably *Staphylococcus aureus*, *Streptococcus faecalis*, *Streptococcus hemolyticus*, and *Mycobacterium ranae*. They are all white, practically odorless and tasteless solids with melting points ranging from about 85° C to about 240° C. My new chlorine substituted (1-aryl-2-nitroalkyl)-phenols are only slightly soluble in water, but are freely soluble in aqueous solutions of many common organic solvents. They are freely soluble in organic solvents such as methanol, ethanol, isopropyl alcohol, acetone, benzene, chloroform, ethyl acetate and butyl acetate. This solubility in organic solvents makes the compounds useful in various application forms such as creams, lotions, tinctures, and so forth. They may be dissolved in the above solvents alone or in aqueous solutions or mixtures of these solvents to form topical solutions.

The alkali metal salts of the products are relatively soluble in water. The potassium salt of 4-(1-p-chlorophenyl-2-nitrobutyl)-2,5-dichlorophenol and the sodium salt of 4-(1-p-chlorophenyl-2-nitropropyl)-2,5-dichlorophenol are both freely soluble in water in concentrations of 5% and 10% of the salts. Solutions of the alkali metal salts show approximately the same level of activity as the chlorine substituted (1-aryl-2-nitroalkyl)phenols. Thus the alkali metal salt forms are very useful in making water solutions valuable as non-irritant skin disinfectants, mouth washes, etc.

The following examples are offered to illustrate my invention and it is to be understood that I do not intend to be limited to the exact amounts and procedures set forth therein. The scope of the invention is as defined in this specification and the attached claims and I intend for all equivalents thereof apparent to those skilled in the art to be specifically included within said scope. Concentrations of the sulfuric acid and inert organic solvents may be varied greatly and the reaction time and reaction temperature may be changed.

EXAMPLE I

To 200 grams of 92% sulfuric acid plus 10 ml. of cyclohexane cooled in a water bath was added slowly a solution of 29.5 gm. (0.18 mol) of 2,5-dichlorophenol in 38 gm. of 1-p-chlorophenyl-2-nitro-1-butanol plus 7 ml. of cyclohexane. The mixture was stirred during addition, and the temperature was held at 17 to 19° C. Stirring was continued for 10 minutes after the addition was completed. (Total reaction time, 70 minutes.) Twenty-five ml. more of cyclohexane were added and then the mixture was poured into 400 ml. of water. This was then filtered and the precipitate was washed with several 10 ml. portions of cyclohexane to give 40 gm. (65% yield) of almost-white product. A sample for analysis was recrystallized from benzene. The recrystallized 4-(1-p-chlorophenyl-2-nitrobutyl)-2,5-dichlorophenol had a melting point of 189–189.5° C. Theoretical analysis for the compound is 28.39% chlorine and 3.74% nitrogen. The analysis showed 28.10% chlorine and 3.54% nitrogen.

EXAMPLE II

To a stirred mixture of 55.5 grams of 2,5-dichlorophenol and 123.6 grams of 90% sulfuric acid cooled in an ice water bath to 20° C. was added dropwise 66.7 grams of 2-nitro-1-p-chlorophenyl-1-propanol. The mixture was stirred for 20 minutes longer and left standing to precipitate. The mixture was filtered through sintered glass and the precipitate washed with 100 ml. of cyclohexane to give 80.8 grams of 4-(1-p-chlorophenyl-2-nitropropyl)-2,5-dichlorophenol representing a yield of 65%. Recrystallization from a benzene-cyclohexane mixture gave a sample of melting point 178–180° C. analyzing 29.50% chlorine and 3.72% nitrogen against theoretical values of 29.59% chlorine and 3.88% nitrogen.

EXAMPLE III

To a mixture of 150 ml. of 93% sulfuric acid and 10 ml. of cyclohexane at 18–20° C. was added over 45 minutes a solution of 32.6 grams of 2,4-dichlorophenol in 50 grams of crude 2-nitro-1-p-chlorophenyl-1-butanol and 10 ml. of cyclohexane. The reaction was cooled by tap water and stirred for 4 hours after addition of the dichlorophenol solution. The reaction mixture was poured into 500 ml. of water, stirred, and the water decanted. To the organic layer remaining was added 100 ml. of concentrated sulfuric acid with stirring for 30 minutes. The mixture was again poured into 500 ml. of water and stirred while cooling. Filtration yielded 34 grams of crude 2 - (1 - p-chlorophenyl-2-nitrobutyl)-4,6-dichlorophenol. Recrystallization of a sample from a benzene-cyclohexane mixture gave a white powder of melting point 130.5–132° C. and analysis of 28.41% chlorine and 3.62% nitrogen against a theoretical analysis of 28.39% chlorine and 3.74% nitrogen.

To illustrate the preparation of the alkali metal salts of these new compounds the following example is included.

EXAMPLE IV

To a solution of 0.36 gm. (0.001 mol) of 4-(1-p-chlorophenyl-2-nitropropyl)-2,5-dichlorophenol from Example II in 2.5 ml. of ethanol was added a solution of 0.6 gm. (0.0011 mol) of sodium methoxide in 2.5 ml. of ethanol. This mixture was then added to 100 ml. of petroleum ether. A crystalline precipitate weighing 0.25 gm. formed. This analyzed 3.66% nitrogen. Theory for the monosodium salt is 3.36%; for the disodium salt is 3.46%.

All of the compounds set out in the group show antiseptic action against several species of bacteria, but they exhibit a wide range of activity toward these microorganisms. In general, for compounds of similar structure, the presence of the hydroxyl group in the para position gives a higher antibacterial activity than when that group is in the ortho position. These compounds are more active toward gram-positive and Mycobacteria than toward gram-negative bacteria. The antibacterial activity of several examples of these new compounds and their alkali metal salts is set out in Table I below which shows the minimum inhibitory concentration in micrograms per milliliter of the compounds tested against the various strains of bacteria. The compounds tested were:

*Key to Table I*

| Number | Compound |
|---|---|
| 1 | 4-(1-p-chlorophenyl-2-nitropropyl)-2, 5-dichlorophenol. |
| 2 | 4-(1-p-chlorophenyl-2-nitrobutyl)-2, 5-dichlorophenol. |
| 3 | 4-(1-p-tolyl-2-nitrobutyl)-2, 5-dichlorophenol. |
| 4 | 2-(1-p-chlorophenyl-2 nitrobutyl)-3, 4, 6-trichlorophenol. |
| 5 | 2-(1 p-chlorophenyl-2-nitrobutyl)-4, 6-dichlorophenol. |
| 6 | 4-(1 p-chlorophenyl-2-nitrobutyl)-2-chlorophenol. |
| 7 | 2-(1-o, p-dichlorophenyl-2-nitrobutyl)-3, 4, 6-trichlorophenol. |
| 8 | 4 (1-o, p-dichlorophenyl-2 nitrobutyl)-2, 5-dichlorophenol. |
| 9 | Sodium salt of 4-(1-p-chlorophenyl-2-nitropropyl)-2, 5-dichlorophenol. |
| 10 | Potassium salt of 4-(1-p-chlorophenyl-2-nitrobutyl)-2, 5-dichlorophenol. |

Now having described my invention, what I claim is:

1. As a new composition of matter, a compound selected from the group consisting of the compounds represented by the formula $$HOC_6H_nCl_{4-n}CH(Ar)CH(NO_2)R$$

wherein R is selected from the group consisting of methyl and ethyl, Ar is selected from the group consisting of phenyl, p-tolyl, 4-chlorophenyl, and 2,4-dichlorophenyl, and $n$ is an integer from 1 to 3, and alkali metal salts thereof.

2. The compound 4-(1-p-chlorophenyl-2-nitropropyl)-2,5-dichlorophenol.

3. The potassium salt of 4-(1-p-chlorophenyl-2-nitrobutyl)-2,5-dichlorophenol.

4. The compound 4-(1-p-tolyl-2-nitrobutyl)-2,5-dichlorophenol.

5. The compound 4-(1-o,p-dichlorophenyl-2-nitrobutyl)-2,5-dichlorophenol.

6. The sodium salt of 4-(1-p-chlorophenyl-2-nitropropyl)-2,5-dichlorophenol.

7. A process for the production of compounds represented by the formula $$HOC_6H_nCl_{4-n}CH(Ar)CH(NO_2)R$$

wherein R is selected from the group consisting of methyl and ethyl, Ar is selected from the group consisting of phenyl, p-tolyl, 4-chlorophenyl, and 2,4-dichlorophenyl, and $n$ is an integer from 1 to 3, which comprises reacting a compound represented by the formula $$HOC_6H_nCl_{5-n}$$

wherein $n$ is an integer from 2 to 4 with a compound represented by the formula $$HOCH(Ar)CH(NO_2)R$$

wherein R is selected from the group consisting of methyl and ethyl and Ar is selected from the group consisting of phenyl, p-tolyl, 4-chlorophenyl, and 2,4-dichlorophenyl in the presence of sulfuric acid of a concentration of greater than about 70 per cent and recovering the product formed.

8. The process as set forth in claim 7 wherein the reaction is carried out in the presence of an inert organic solvent.

9. The process as set out in claim 7 above wherein the reaction is carried out at a temperature of from 0 to 35° C.

10. The process as set out in claim 7 above wherein the reaction is carried out in the presence of an inert organic solvent at a temperature of from 0 to 35° C.

References Cited in the file of this patent

UNITED STATES PATENTS 1,880,566    Weiler et al. _____ Oct. 4, 1932

*Table I*
INHIBITORY CONCENTRATIONS OF COMPOUNDS EXAMINED

| No. | Minimum Inhibitory Concentrations (Micro. g./ml.) against— | | | | | | | |
|---|---|---|---|---|---|---|---|---|
| | Staph. aureus | Strep. fecalis | Strep. hemo. | E. coli | Past. pseudoth. | Shig. dysenteriae | Myco. Spp. 607 | Myco. ranae |
| 1 | 10 | 25 | 10 | >100 | >100 | >100 | 5 | 5 |
| 2 | 10 | 10 | 10 | ¹>100 | ¹>100 | ¹>100 | 5 | 5 |
| 3 | 10 | 10 | 10 | >100 | >100 | >100 | 5 | 5 |
| 4 | 50 | 75 | 50 | ¹>100 | >100 | 75 | 50 | 50 |
| 5 | 50 | 75 | 50 | >100 | 75 | >100 | 10 | 10 |
| 6 | 25 | 25 | 25 | >100 | >100 | >100 | 25 | 25 |
| 7 | 75 | 75 | 75 | >100 | ¹>100 | ¹>100 | 10 | 10 |
| 8 | 50 | 50 | 50 | ¹>100 | ¹>100 | ¹>100 | 10 | 10 |
| 9 | 25 | 50 | 25 | >100 | >100 | >100 | 5 | 5 |
| 10 | 25 | 25 | 25 | >100 | >100 | >100 | 5 | .5 |

¹ Partial inhibition.